United States Patent
Kanazawa et al.

(10) Patent No.: US 10,985,678 B2
(45) Date of Patent: Apr. 20, 2021

(54) MOTOR CONTROL APPARATUS AND MOTOR CONTROL METHOD

(71) Applicant: SINFONIA TECHNOLOGY CO., LTD., Tokyo (JP)

(72) Inventors: Kazunari Kanazawa, Tokyo (JP); Takeshi Tomizaki, Tokyo (JP); Nobumasa Usiro, Tokyo (JP); Makoto Maruyama, Tokyo (JP); Yuji Ogawa, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 0 days.

(21) Appl. No.: 16/607,529

(22) PCT Filed: Oct. 30, 2017

(86) PCT No.: PCT/JP2017/039138
§ 371 (c)(1),
(2) Date: Oct. 23, 2019

(87) PCT Pub. No.: WO2018/198405
PCT Pub. Date: Nov. 1, 2018

(65) Prior Publication Data
US 2020/0144943 A1 May 7, 2020

(30) Foreign Application Priority Data
Apr. 28, 2017 (JP) .............................. JP2017-089095

(51) Int. Cl.
*H02K 17/16* (2006.01)
*H02P 6/15* (2016.01)

(52) U.S. Cl.
CPC .................................. *H02P 6/153* (2016.02)

(58) Field of Classification Search
CPC .... H02P 6/153; H02P 6/22; H02P 6/16; H02P 6/20
See application file for complete search history.

(56) References Cited

U.S. PATENT DOCUMENTS

| 4,694,210 A | 9/1987 | Elliott et al. |
| 2009/0189552 A1* | 7/2009 | Mizumaki ................. H02P 6/16 318/400.1 |

(Continued)

FOREIGN PATENT DOCUMENTS

| JP | 2011066960 A | 3/2011 |
| JP | 2015100141 A | 5/2015 |

(Continued)

OTHER PUBLICATIONS

International Search Report (PCT/ISA/210) dated Jan. 30, 2018, by the Japan Patent Office as the International Searching Authority for International Application No. PCT/JP2017/039138.

(Continued)

*Primary Examiner* — Muhammad S Islam
(74) *Attorney, Agent, or Firm* — Buchanan Ingersoll & Rooney PC

(57) ABSTRACT

A motor control apparatus includes: a motor drive control section that controls driving of a motor using a predetermined phase; a rotation position detecting section that, at every 180 degrees of an electrical angle of the motor, outputs two kinds of detection signals according to the rotation position of the rotor of the motor; a stopped position estimating section that estimates the stopped position at the start of rotation of the rotor using an elapsed time from when rotation the rotor starts until the kind of the detection signal outputted from the rotation position detecting section switches; a rotational speed estimating section that estimates the rotational speed of the rotor using the elapsed time and the stopped position; and an estimated phase calculating section that calculates an estimated phase as the aforementioned predetermined phase using the rotational speed.

5 Claims, 5 Drawing Sheets

(56) References Cited

U.S. PATENT DOCUMENTS

| | | | |
|---|---|---|---|
| 2011/0025243 A1 | 2/2011 | Lin | |
| 2015/0069941 A1 | 3/2015 | Iwaji et al. | |
| 2015/0265121 A1* | 9/2015 | Kim | H02K 7/04 |
| | | | 15/319 |
| 2016/0233803 A1* | 8/2016 | Hano | H02P 6/188 |
| 2016/0285398 A1* | 9/2016 | Mizuo | H02P 6/15 |

FOREIGN PATENT DOCUMENTS

| | | |
|---|---|---|
| JP | 2015100142 A | 5/2015 |
| JP | 2016067081 A | 4/2016 |
| JP | 2016082615 A | 5/2016 |
| WO | 2013153657 A1 | 10/2013 |

OTHER PUBLICATIONS

Written Opinion (PCT/ISA/237) dated Jan. 30, 2018, by the Japan Patent Office as the International Searching Authority for International Application No. PCT/JP2017/039138.

The extended European Search Report dated Feb. 26, 2020, by the European Patent Office in corresponding European Application No. 17907254.1. (10 pages).

The extended European Search Report dated Feb. 26, 2020, by the European Patent Office in corresponding European Application No. 17907800.1. (11 pages).

International Search Report (with English Translation) and Written Opinion issued in corresponding International Patent Application No. PCT/2017/039139, dated Jan. 16, 2018. (11 pages).

Notification Concerning Transmittal of International Preliminary Report on Patentability (Chapter 1 of the Patent Cooperation Treaty) (Forms PCT/IB/326, PCT/IB/373 and PCT/ISA/237) dated Nov. 7, 2019, by the International Bureau of WIPO, in corresponding International Application No. PCT/JP2017/039138. (3 pages).

Notification of Transmittal of Translation of the International Preliminary Report on Patentability (Chapter 1 or Chapter 2) (Forms PCT/IB/338, PCT/IB/373 and PCT/ISA/237) dated Nov. 7, 2019, by the International Bureau of WIPO, in corresponding International Application No. PCT/JP2017/039138. (6 pages).

The Examiner's attention is directed to co-pending U.S. Appl. No. 16/607,449, filed Oct. 23, 2019.

Official Action issued in corresponding European Patent Application No. 17907254.1, dated Dec. 8, 2020 (4 pages).

* cited by examiner

MOTOR CONTROL APPARATUS AND MOTOR CONTROL METHOD

TECHNICAL FIELD

The present invention relates to a motor control apparatus and a motor control method which, at the start of rotation of a motor, control driving of the motor using a detection signal that is outputted at every 180 degrees in terms of electrical angle in accordance with rotation of a rotor.

BACKGROUND ART

A motor control apparatus is known that, at the start of rotation of a motor, controls driving of the motor using a detection signal that is outputted at every 180 degrees in terms of electrical angle in accordance with rotation of a rotor. As such kind of motor control apparatus, for example, in Patent Literature 1, an estimated phase detection device is disclosed that estimates the phase of a rotor based on a position sensor signal of H or L that is outputted according to a phase-position relation in a circumferential direction with a sensor target that is attached on the rotor side, and a rotational speed of the rotor that is detected based on a time interval in which the position sensor signal is switched.

More specifically, in the estimated phase detection device disclosed in the aforementioned Patent Literature 1, in a first time period until switching of the position sensor signal is detected twice, a phase is estimated based on the sum of a reference phase that is defined in correspondence with H or L of the position sensor signal and an interpolation phase that is obtained by double integration of the starting acceleration. On the other hand, in a second time period after the first time period elapses, the estimated phase detection device estimates a phase based on the sum of the reference phase that is based on the position sensor signal that is switched, and an interpolation phase obtained by integrating rotational speeds detected prior to switching of the position sensor signal.

CITATION LIST

Patent Literature

Patent Literature 1: Japanese Patent Laid-Open No. 2015-100142

SUMMARY OF INVENTION

Technical Problem

According to the configuration disclosed in the aforementioned Patent Literature 1, in the first time period until switching of the position sensor signal is detected twice, because the rotational speed (detected speed) cannot be obtained when calculating the phase, the phase is estimated using the starting acceleration. Hence, according to the configuration disclosed in the aforementioned Patent Literature 1, in order to accurately estimate a phase using a rotational speed so as to be able to perform drive control of a motor, a time period from a time that rotation of the rotor starts until switching of the position sensor signal is detected twice is required.

Therefore, according to the configuration disclosed in the aforementioned Patent Literature 1, because the responsiveness at the start of rotation of the motor is not very high, time is required until the rotational speed of the rotor reaches a predetermined speed.

An object of the present invention is, with respect to a motor control apparatus including a rotation position detecting section which is capable of detecting a rotation position of a rotor every 180 degrees in terms of electrical angle, to obtain a configuration with which the responsiveness at the start of rotation of the motor is high.

Solution to Problem

A motor control apparatus according to one embodiment of the present invention includes: a motor drive control section that controls driving of a motor using a predetermined phase that causes a rotor of the motor to perform forward rotation; a rotation position detecting section that, at every 180 degrees of an electrical angle of the motor, outputs two kinds of detection signals according to a rotation position of the rotor of the motor; a stopped position estimating section that estimates a stopped position at a start of rotation of the rotor using an elapsed time from when rotation of the rotor starts until the kind of the detection signal that is outputted from the rotation position detecting section switches; a rotational speed estimating section that estimates a rotational speed of the rotor using the elapsed time and the stopped position; and an estimated phase calculating section that calculates an estimated phase as the predetermined phase using the rotational speed.

A method for controlling a motor according to one embodiment of the present invention includes: a fixed phase setting step of, at a start of rotation of a rotor of the motor, in accordance with two kinds of detection signals that are outputted from a rotation position detecting section according to a rotation position of the rotor of the motor at every 180 degrees of an electrical angle of the motor, setting as a fixed phase an electrical angle that is equal to or greater than −90 degrees relative to a stable stopping point at a maximum electrical angle and is equal to or less than 90 degrees relative to a stable stopping point at a minimum electrical angle among stable stopping points of the rotor; a stopped position estimating step of estimating a stopped position at a start of rotation of the rotor using an elapsed time from when rotation of the rotor starts until the kind of the detection signal that is outputted from the rotation position detecting section switches due to driving of the motor being controlled by means of a motor drive control section using the fixed phase; a rotational speed estimating step of estimating a rotational speed of the rotor using the elapsed time and the stopped position; and an estimated phase calculating step of calculating an estimated phase using the rotational speed.

Advantageous Effects of Invention

According to a motor control apparatus according to one embodiment of the present invention, in a configuration that includes a rotation position detecting section that is capable of detecting a rotation position of a motor every 180 degrees in terms of electrical angle, the stopped position at the start of rotation of a rotor is estimated using an elapsed time from when rotation of the rotor starts until the kind of a detection signal that is outputted from the rotation position detecting section switches. According to the motor control apparatus, an estimated phase to be used for drive control of the motor is calculated based on a rotational speed of the rotor that is estimated using the elapsed time and the stopped position.

Thereby, in a motor that includes a rotation position detecting section that is capable of detecting the rotation position of a rotor every 180 degrees in terms of electrical angle, the stopped position at the start of rotation of the rotor can be easily estimated, and drive control of the motor can be performed based on a rotational speed of the rotor that is estimated using the stopped position. It is thus possible to realize a configuration in which the responsiveness when rotation of the motor starts is high.

DESCRIPTION OF EMBODIMENTS

Figure 1:
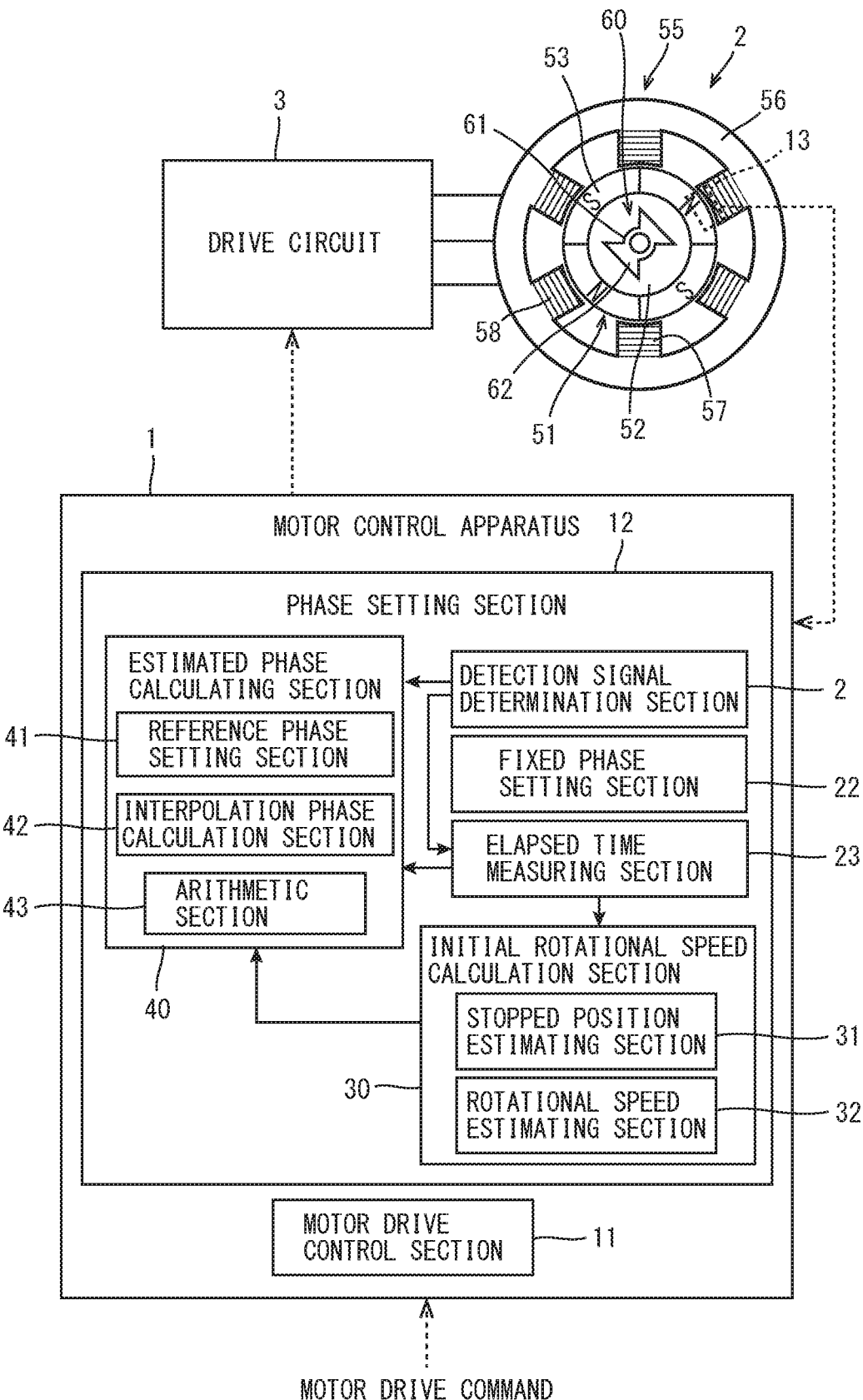
FIG. 1 is a control block diagram illustrating a schematic configuration of a motor control apparatus according to embodiment.

A motor control apparatus according to one embodiment of the present invention includes: a motor drive control section that controls driving of a motor using a predetermined phase that causes a rotor of the motor to perform forward rotation; a rotation position detecting section that, at every 180 degrees of an electrical angle of the motor, outputs two kinds of detection signals according to a rotation position of the rotor of the motor; a stopped position estimating section that estimates a stopped position at a start of rotation of the rotor using an elapsed time from when rotation of the rotor starts until the kind of the detection signal that is outputted from the rotation position detecting section switches; a rotational speed estimating section that estimates a rotational speed of the rotor using the elapsed time and the stopped position; and an estimated phase calculating section that calculates an estimated phase as the predetermined phase using the rotational speed (first configuration).

According to the configuration described above, the stopped position at the start of rotation of the rotor is estimated using an elapsed time from when rotation of the rotor starts until the kind of the detection signal that is outputted from the rotation position detecting section switches. Thereby, the stopped position can be easily estimated.

Further, the motor control apparatus having the aforementioned configuration uses the elapsed time and the stopped position to estimate the rotational speed of the rotor, and calculates an estimated phase using the rotational speed. Thereby, when the rotor is caused to start rotation, it is possible to switch more quickly to drive control of the motor that uses the rotational speed of the rotor in comparison to the conventional configuration. Therefore, the responsiveness at the start of rotation of the motor can be improved.

In the first configuration, the stopped position estimating section estimates which stable stopping point of the rotor the stopped position is according to the elapsed time (second configuration).

The rotation position at which a rotor of a motor stops is determined by the influence of cogging torque that is generated in the motor. That is, the rotor stops at a position (stable stopping point) of an electrical angle at which the cogging torque is zero and a gradient of the cogging torque with respect to the electrical angle is negative.

Hence, the stopped position at the start of rotation of the rotor can be easily and accurately estimated from among stable stopping points based on an elapsed time from when rotation of the rotor starts until the kind of the detection signal that is outputted from the rotation position detecting section switches.

The motor control apparatus according to the first or second configuration further includes a fixed phase setting section that, at the start of rotation of the rotor, in accordance with the detection signal, sets as the predetermined phase a fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor (third configuration).

Thereby, at the start of rotation of the rotor, because a fixed phase is used for drive control of the motor, it is not necessary to calculate a phase using the starting acceleration as in the conventional configuration. Hence, the phase at the start of rotation of the rotor is easily obtained.

Figure 3:
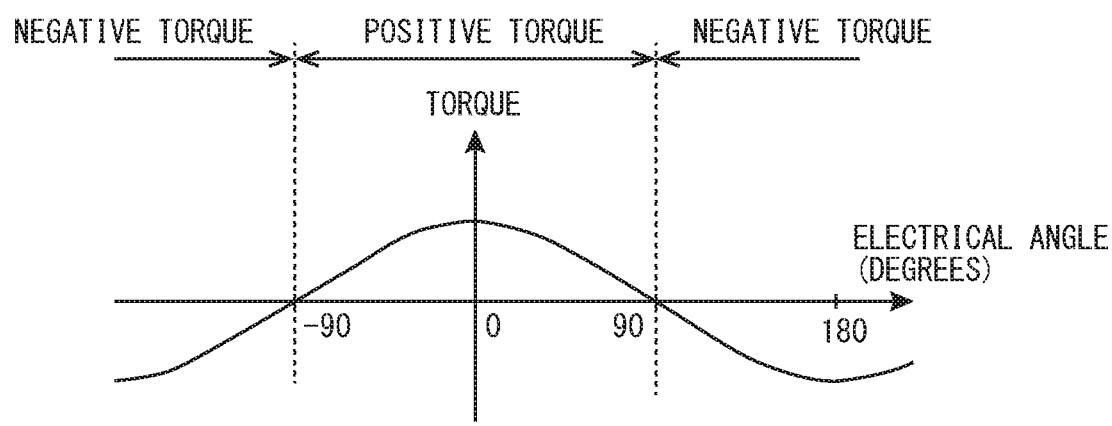
FIG. 3 is a view that schematically illustrates the relation between an error between a fixed phase and an actual phase, and torque generated at a rotor.

In this connection, in a case where an error between a fixed phase and an actual phase of a motor (hereunder, referred to as "actual phase") is greater than 90 degrees in terms of the absolute value of the electrical angle, a negative torque is generated at the rotor, as illustrated in FIG. 3. This means that, when performing drive control of the motor, if the phase of current that is applied to a stator coil deviates by greater than 90 degrees in terms of the absolute value of the electrical angle relative to the actual phase, the torque which a magnet of the rotor receives (hereunder, referred to as "magnet torque") is in the reverse direction. On the other hand, if the error between the fixed phase and the actual phase is equal to or less than 90 degrees in terms of the absolute value of the electrical angle, the magnet torque is not in the reverse direction.

Contrary to this, in the above described configuration, when rotation of the rotor starts, in accordance with a detection signal that is outputted from the rotation position detecting section, a fixed phase which is equal to or greater than −90 degrees in terms of electrical angle relative to a stable stopping point at a maximum electrical angle and is equal to or less than 90 degrees in terms of electrical angle relative to a stable stopping point at a minimum electrical angle among the stable stopping points of the rotor is adopted as the fixed phase. Thereby, an error in the aforementioned fixed phase can be made equal to or less than 90 degrees in terms of the absolute value of the electrical angle relative to the phase at a rotation position of the rotor that stops at a stable stopping point.

Therefore, according to the above described configuration, rotation of the rotor in the reverse direction can be prevented even in a case where startup control of the motor is performed using the fixed phase. Accordingly, it is possible to quickly start the motor.

A method for controlling a motor according to one embodiment of the present invention includes: a fixed phase setting step of, at a start of rotation of a rotor of the motor, in accordance with two kinds of detection signals that are outputted from a rotation position detecting section according to a rotation position of the rotor of the motor at every 180 degrees of an electrical angle of the motor, setting as a fixed phase an electrical angle that is equal to or greater than −90 degrees relative to a stable stopping point at a maximum electrical angle and is equal to or less than 90 degrees relative to a stable stopping point at a minimum electrical angle among stable stopping points of the rotor; a stopped position estimating step of estimating a stopped position at a start of rotation of the rotor using an elapsed time from when rotation of the rotor starts until the kind of the detection signal that is outputted from the rotation position detecting section switches due to driving of the motor being controlled by means of a motor drive control section using the fixed phase; a rotational speed estimating step of estimating a rotational speed of the rotor using the elapsed time and the stopped position; and an estimated phase calculating step of calculating an estimated phase using the rotational speed (first method).

Hereunder, embodiments of the present invention are described in detail with reference to the accompanying drawings. The same or equivalent parts in the drawings are denoted by the same reference numerals and a description of such parts is not repeated.

FIG. 1 is a block diagram illustrating the schematic configuration of a motor control apparatus 1 according to embodiment of the present invention. The motor control apparatus 1 outputs a control signal to a drive circuit 3 that causes a motor 2 to drive. That is, the motor control apparatus 1 controls driving of the motor 2. The motor 2 includes a rotor 51, a stator 55 and a detection target 60. In FIG. 1, reference numeral 13 denotes a position detecting sensor, described later, that detects a rotation position of the detection target 60.

The motor 2 is, for example, a so-called "inner-rotor type motor" in which the rotor 51 is disposed inside the stator 55 which has a cylindrical shape. Note that, the motor may be a so-called "outer-rotor type motor" in which the rotor rotates on the outward side in the radial direction of the stator.

The rotor 51 includes a rotor core 52, and field magnets 53 that are arranged side-by-side in the circumferential direction at an outer circumferential portion of the rotor core 52. In the present embodiment, four of the field magnets 53 are arranged at the outer circumferential portion of the rotor core 52. That is, the number of poles of the motor 2 of the present embodiment is four. Note that the field magnets 53 may be disposed inside the rotor core.

The stator 55 includes a substantially cylindrical yoke 56, a plurality of (in the present embodiment, six) teeth 57 that extend in the inward direction from the inner circumferential face of the yoke 56, and coils 58 that are wound around the teeth 57. The yoke 56 and the plurality of teeth 57 are integrally formed.

The motor 2 of the present embodiment is, for example, a motor in which the number of poles is four and the number of slots is six. Note that, the number of poles of the motor 2 may be other than four, and the number of slots may be other than six.

The detection target 60 rotates integrally with the rotor 51. The detection target 60 is made of magnetic material. The detection target 60 includes a main body portion 61, and a pair of protruding portions 62 that protrude from the main body portion 61 toward one direction and the other direction, respectively, in the radial direction of the motor 2. That is, the pair of protruding portions 62 are provided at an interval of 180 degrees on the outer circumferential side of the main body portion 61. Thus, the detection target 60 has concavities and convexities in the outer circumferential surface thereof.

The drive circuit 3 is a switching circuit having a plurality of switching elements (not illustrated in the drawing) that constitute a three-phase bridge circuit, so as to cause the motor 2 to drive. The drive circuit 3 has the same configuration as a common switching circuit, and hence a detailed description will be omitted here.

The motor control apparatus 1 outputs a control signal for driving the switching elements to the drive circuit 3 in accordance with a motor drive command that is inputted thereto. Further, in accordance with the motor drive command, the motor control apparatus 1 controls driving of the motor 2 by performing phase control based on the rotation position of the rotor 51 of the motor 2. Note that, the motor drive command is inputted into the motor control apparatus 1 from an unshown higher order controller.

Specifically, the motor control apparatus 1 includes a motor drive control section 11, a phase setting section 12 and a rotation position detecting section 13. The motor drive control section 11 generates a control signal for causing the motor 2 to drive, in accordance with a phase that is set by the phase setting section 12. The motor drive control section 11 outputs the control signal that is generated to the drive circuit 3. Note that, the configuration of the motor drive control section 11 is the same as the conventional configuration, and hence a detailed description thereof will be omitted here.

The rotation position detecting section 13 has a magnet that generates magnetic flux between the rotor 51 and the detection target 60 that rotates integrally with the rotor 51. When the detection target 60 which has concavities and convexities in the outer circumferential surface thereof rotates integrally with the rotor 51, the rotation position detecting section 13 detects changes in the magnetic flux between the detection target 60 and the rotation position detecting section 13, and outputs detection signals of two kinds (a High signal and a Low signal). When the rotation position detecting section 13 detects a change in the magnetic flux between the detection target 60 and the rotation position detecting section 13, the rotation position detecting section 13 is switched the kind of the detection signal.

Specifically, in a case where either one of the pair of protruding portions 62 of the detection target 60 is positioned on the inner side in the radial direction, the rotation position detecting section 13 outputs the High signal as the detection signal, while in a case where a part other than the pair of protruding portions 62 of the detection target 60 is positioned on the inner side in the radial direction, the rotation position detecting section 13 outputs the Low signal as the detection signal. The detection signal that is outputted from the rotation position detecting section 13 is inputted to the phase setting section 12 in the motor control apparatus 1. Note that, when starting the motor 2 also, the rotation position detecting section 13 outputs one detection signal among the two kinds of detection signals (High signal and Low signal) in accordance with the rotation position of the detection target 60.

The phase setting section 12 sets a phase to be used by the motor drive control section 11 in accordance with the detection signal that is outputted from the rotation position detecting section 13. When starting the motor 2, that is, at the start of rotation of the rotor 51, the phase setting section 12 sets a fixed phase in accordance with the detection signal that is outputted from the rotation position detecting section 13. Further, after the fixed phase is set, upon the kind of the detection signal that is outputted from the rotation position detecting section 13 switching due to rotation of the rotor 51, the phase setting section 12 estimates the stopped position of the rotor 51 using the elapsed time from after rotation of the rotor 51 starts until switching (hereunder, referred to as an "edge") of the detection signal, and also determines an estimated phase based on a rotational speed that is obtained using the elapsed time and the stopped position. In addition, the phase setting section 12 determines an estimated phase each time an edge of the detection signal is detected. The fixed phase and the estimated phase are used for controlling driving of the motor 2 in the period in which the fixed phase and the estimated phase are set by the phase setting section 12.

Specifically, the phase setting section 12 includes a detection signal determination section 21, a fixed phase setting section 22, an elapsed time measuring section 23, an initial rotational speed calculation section 30 and an estimated phase calculating section 40.

When the detection signal that is outputted from the rotation position detecting section 13 is switched to the Low signal or the High signal, the detection signal determination section 21 detects an edge of the detection signal. Further, in a case where the detection signal determination section 21 detects an edge of the detection signal, the detection signal determination section 21 outputs a calculation instruction signal. As described later, the calculation instruction signal is inputted into the elapsed time measuring section 23 and the estimated phase calculating section 40.

During a period from the time of starting of the motor 2 until the aforementioned calculation instruction signal is outputted by the detection signal determination section 21, the fixed phase setting section 22 sets a fixed phase in accordance with the detection signal that is outputted from the rotation position detecting section 13.

Specifically, at startup of the motor 2, in a case where the detection signal that is outputted from the rotation position detecting section 13 is the Low signal, the fixed phase setting section 22 sets 90 degrees in terms of electrical angle as a fixed phase. On the other hand, at startup of the motor 2, in a case where the detection signal that is outputted from the rotation position detecting section 13 is the High signal, the fixed phase setting section 22 sets 270 degrees in terms of electrical angle as a fixed phase. The fixed phase is used for drive control of the motor 2.

Figure 2:
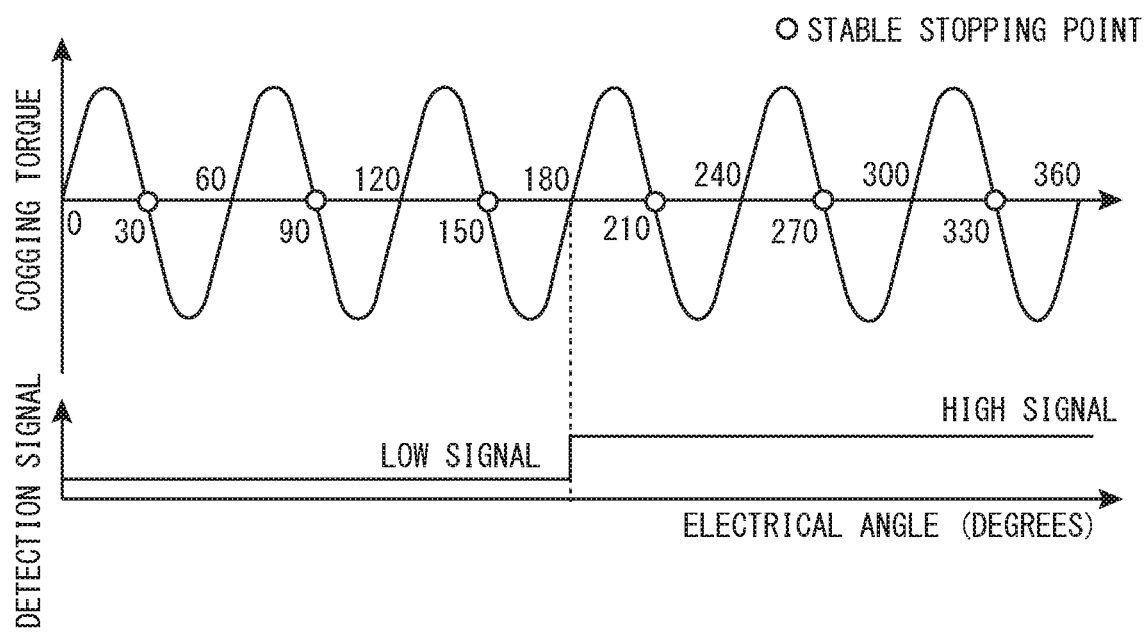
FIG. 2 is a view that schematically illustrates the relation between an electrical angle, and cogging torque and a detection signal.

In this case, the rotation position at which the rotor 51 of the motor 2 stops is determined by the influence of cogging torque that is generated in the motor 2. That is, the rotor 51 stops at the position (stable stopping point) of an electrical angle at which the cogging torque is zero and a gradient of the cogging torque with respect to the electrical angle is negative. The relation between cogging torque that is generated in the motor 2 and stable stopping points of the rotor 51 is illustrated in FIG. 2. As illustrated in FIG. 2, within a range in which the electrical angle is from 0 degrees to 180 degrees, the stable stopping points are 30 degrees (stable stopping point at minimum electrical angle), 90 degrees and 150 degrees (stable stopping point at maximum electrical angle), and within a range in which the electrical angle is from 180 degrees to 360 degrees, the stable stopping points are 210 degrees (stable stopping point at minimum electrical angle), 270 degrees and 330 degrees (stable stopping point at maximum electrical angle).

Note that, in FIG. 2, the position at which the detection signal that is outputted from the rotation position detecting section 13 is switched from the High signal to the Low signal is at an electrical angle of 0 degrees. Hence, in FIG. 2, the position at which the detection signal that is outputted from the rotation position detecting section 13 is switched from the Low signal to the High signal is 180 degrees in terms of electrical angle.

In this connection, in a case where there is an error between the phase that is used for drive control of the motor 2 and the actual phase of the motor 2, the torque that is generated at the rotor 51 also changes according to the error. The relation between the aforementioned error and the torque that is generated at the rotor 51 is illustrated in FIG. 3. Note that, in FIG. 3, a positive value of the magnet torque (hereunder, also referred to as simply "torque") represents torque that causes the rotor 51 to rotate in the rotational direction indicated in the motor drive command (hereunder, referred to as "forward rotation") when causing the motor 2 to drive. On the other hand, in FIG. 3, a negative value of the torque represents torque that causes the rotor 51 to rotate in the reverse direction to the rotational direction indicated in the motor drive command (hereunder, referred to as "reverse rotation"). Further, in the following description, an error in a phase is a value obtained by subtracting the phase that is used for drive control of the motor 2 from the actual phase.

As illustrated in FIG. 3, within a range in which the aforementioned error is greater than −90 degrees and is less than 90 degrees in terms of electrical angle, a positive torque, that is, a torque that causes the rotor 51 to perform forward rotation is generated at the rotor 51. On the other hand, within a range in which the aforementioned error is greater than 90 degrees and is less than −90 degrees in terms of electrical angle, a negative torque, that is, a torque that causes the rotor 51 to perform reverse rotation is generated at the rotor 51.

Accordingly, if an error between the phase used for drive control of the motor 2 and the actual phase of the motor 2 is less than 90 degrees in terms of the absolute value of the electrical angle, the rotor 51 can be caused to perform forward rotation. Thereby, the motor 2 can be quickly started.

FIG. 2 illustrates the relation between the detection signal that is outputted from the rotation position detecting section 13 and the electrical angle. As illustrated in FIG. 2, in a case where the detection signal is the Low signal, the electrical angle is between 0 degrees and 180 degrees, and in a case where the detection signal is the High signal, the electrical angle is between 180 degrees and 360 degrees.

Hence, in a case where the detection signal is the Low signal, although it is not known which stopping position among 30 degrees, 90 degrees and 150 degrees in terms of electrical angle the rotor 51 stops at, as mentioned previously, by setting the fixed phase to 90 degrees in terms of electrical angle, an error between the actual phase at the stopping position of the rotor 51 and the fixed phase can be made equal to or less than 90 degrees in terms of the absolute value of the electrical angle.

Similarly, in a case where the detection signal is the High signal, although it is not known which stopping position among 210 degrees, 270 degrees and 330 degrees in terms of electrical angle the rotor 51 stops at, as mentioned previously, by setting the fixed phase to 270 degrees in terms of electrical angle, an error between the actual phase at the stopping position of the rotor 51 and the fixed phase can be made equal to or less than 90 degrees in terms of the absolute value of the electrical angle.

As described above, by setting the fixed phase to 90 degrees in terms of electrical angle when the detection signal is the Low signal, and setting the fixed phase to 270 degrees in terms of electrical angle when the detection signal is the High signal, the rotor 51 can be caused to perform forward rotation when starting the motor 2. That is, at the start of rotation of the rotor 51, the fixed phase setting section 22 sets the fixed phase to 90 degrees or 270 degrees in terms of electrical angle in accordance with the detection signal. Thereby, the error between the fixed phase and the actual phase becomes equal to or less than 90 degrees in terms of the absolute value of the electrical angle. Hence, the rotor 51 of the motor 2 can be prevented from rotating in the reverse direction.

The elapsed time measuring section 23 measures an elapsed time from when rotation of the rotor 51 starts until an edge of the detection signal is detected by the detection signal determination section 21 (until the calculation instruction signal is inputted from the detection signal determination section 21). The elapsed time measuring section 23 also measures an interval at which the edge of the detection signal is detected by the detection signal determination section 21. The elapsed time measured by the elapsed time measuring section 23 is outputted as an elapsed time signal to the initial rotational speed calculation section 30 that is described later. On the other hand, the interval measured by the elapsed time measuring section 23 is outputted as an edge interval signal to the estimated phase calculating section 40 that is described later.

The initial rotational speed calculation section 30 calculates the rotational speed (initial rotational speed) of the rotor 51 from the time that rotation of the rotor 51 starts until detection of the edge of the detection signal, using the elapsed time measured by the elapsed time measuring section 23. Note that, the elapsed time signal outputted from the elapsed time measuring section 23 is inputted into the initial rotational speed calculation section 30.

The initial rotational speed calculation section 30 includes a stopped position estimating section 31 and a rotational speed estimating section 32. The stopped position estimating section 31 estimates the stopped position at the start of rotation of the rotor 51, based on information relating to the elapsed time that is contained in the elapsed time signal. The elapsed time differs according to the stopped position at the start of rotation of the rotor 51. That is, the rotational angle of the rotor 51 until an edge of the detection signal is detected differs depending on the stopped position of the rotor 51, and a torque generated at the rotor 51 in accordance with an error between the actual phase that corresponds to the stopped position and the fixed phase also differs depending on the stopped position of the rotor 51 (see FIG. 3)

The point that the elapsed time differs depending on the stopped position of the rotor 51 will now be described using an example illustrated in FIG. 4. Note that, the following is a description of the respective elapsed times when the rotor 51 stops at stable stopping points of 30 degrees, 90 degrees and 150 degrees (electrical angles) in a case where the signal outputted from the rotation position detecting section 13 is the Low signal, and the fixed phase at the start of rotation of the rotor 51 is set to 90 degrees in terms of electrical angle. Further, hereunder, the respective rotation positions at which the rotor 51 is stopped (30 degrees, 90 degrees and 150 degrees in terms of electrical angle) are described as patterns 1, 2 and 3, respectively.

<Pattern 1>

A case where the rotor 51 stops at the rotation position of 30 degrees in terms of electrical angle is referred to as "pattern 1". In the case of pattern 1, an error between the fixed phase and the actual phase when the motor starts is −60 degrees. In FIG. 4 that shows changes in the torque with respect to the error, the case of pattern 1 is denoted by reference numeral (1). In the case of pattern 1, a positive torque that causes forward rotation is generated at the rotor 51.

Figure 4:
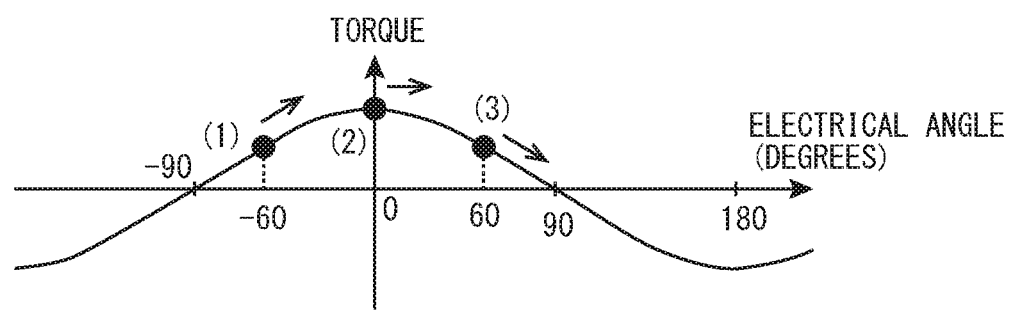
FIG. 4 is a view that schematically illustrates changes in torque generated at a rotor due to rotation of the rotor, in a case where a fixed phase is set.

When the rotor 51 performs forward rotation, the actual phase gradually becomes larger, and consequently the error gradually decreases as indicated by a solid-line arrow in FIG. 4. Thus, the torque generated at the rotor 51 gradually increases.

In a case where the rotor 51 performs forward rotation and the actual phase matches the fixed phase, since the error becomes zero, the torque generated at the rotor 51 becomes the maximum torque. When the rotor 51 performs further forward rotation, the actual phase becomes larger than the fixed phase, and consequently the error that has a positive value gradually increases. Thus, the torque generated at the rotor 51 gradually decreases.

<Pattern 2>

A case where the rotor 51 is stopped at the rotation position of 90 degrees in terms of electrical angle is referred to as "pattern 2". In the case of pattern 2, an error between the fixed phase and the actual phase when the motor starts is 0 degrees. In FIG. 4, the case of pattern 2 is denoted by reference numeral (2). In the case of pattern 2, a positive torque that causes forward rotation is generated at the rotor 51.

A positive torque generated at the rotor 51 is largest at the time that the motor starts. Therefore, the rotor 51 quickly starts rotation when the motor starts. When the rotor 51 performs forward rotation, the actual phase gradually increases, and consequently, as indicated by a solid-line arrow in FIG. 4, the aforementioned error gradually increases. Thus, the torque generated at the rotor 51 gradually decreases.

<Pattern 3>

A case where the rotor 51 stops at the rotation position of 150 degrees in terms of electrical angle is referred to as "pattern 3". In the case of pattern 3, an error between the fixed phase and the actual phase when the motor starts is 60 degrees. In FIG. 4, the case of pattern 3 is denoted by reference numeral (3). In the case of pattern 3, a positive torque that causes forward rotation is generated at the rotor 51.

When the rotor 51 performs forward rotation, the actual phase gradually increases, and consequently, as indicated by a solid-line arrow in FIG. 4, the error gradually increases. Thus, the torque generated at the rotor 51 gradually decreases.

In the respective patterns described above, the elapsed time from the start of rotation of the rotor 51 until detection of an edge of the detection signal is represented by ta, tb and tc, respectively. For the respective patterns, when a rotational angle from the stopped position at the start of rotation of the rotor 51 until detection of an edge of the detection signal, and a positive torque generated at the rotor 51 from the time of starting rotation of the rotor 51 until detection of an edge of the detection signal are taken into consideration, the relation tb<tc<ta holds. That is, in the case of pattern 2, although the rotational angle from the stopped position at the start of rotation of the rotor 51 until detection of an edge of the detection signal is larger compared to the case of pattern 3 in which the aforementioned rotational angle is smallest, a positive torque generated at the rotor 51 is greater than in the case of the aforementioned pattern 3. Therefore, the elapsed time is shorter in the case of pattern 2 compared to the case of pattern 3. Note that, in the case of pattern 1, since a positive torque generated at the rotor 51 is similar to the case of pattern 3, the elapsed time is longer than in the case of pattern 3 by an amount corresponding to the amount by which the rotational angle from the stopped position at the start of rotation of the rotor 51 until detection of an edge of the detection signal is larger compared to the case of pattern 3.

At the stopped position estimating section 31, in the example illustrated in FIG. 4 that is described above, threshold values $t_{th1}$ and $t_{th2}$ are set between the elapsed time in the case of pattern 2 and the elapsed time in the case of pattern 3, and between the elapsed time in the case of pattern 3 and the elapsed time in the case of pattern 1, respectively. Thereby, the stopped position estimating section 31 can estimate the stopped position at the start of rotation of the rotor 51 from among the stable stopping points in accordance with the magnitude relationship between the aforementioned elapsed time and the threshold values $t_{th1}$ and $t_{th2}$.

Figure 5:
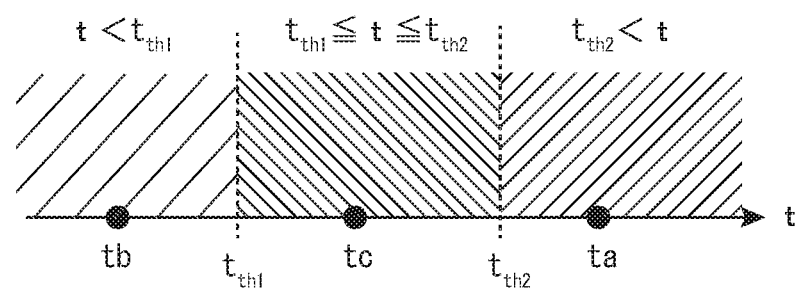
FIG. 5 is a view that schematically illustrates a method for estimating a stopped position at the start of rotation of a rotor using an elapsed time.

Specifically, as illustrated in FIG. 5, in a case where the elapsed time is shorter than the threshold value $t_{th1}$ ($t_{th1}$), the stopped position estimating section 31 estimates that the rotor 51 is stopped at the position of pattern 2 at the start of rotation, that is, at the stable stopping point of 90 degrees in terms of electrical angle. In a case where the elapsed time is equal to or greater than the threshold value $t_{th1}$ and equal to or less than the threshold value $t_{th2}$ ($t_{th1} \leq t \leq t_{th2}$), the stopped position estimating section 31 estimates that the rotor 51 is stopped at the position of pattern 3 at the start of rotation, that is, at the stable stopping point of 150 degrees in terms of electrical angle. In a case where the elapsed time is longer than the threshold value $t_{th2}$ ($t_{th2} < t$), the stopped position estimating section 31 estimates that the rotor 51 is stopped at the position of pattern 1 at the start of rotation, that is, at the stable stopping point of 30 degrees in terms of electrical angle.

As described above, the stopped position estimating section 31 estimates which of the stable stopping points the stopped position of the rotor 51 at the start of rotation is according to the elapsed time.

The rotational speed estimating section 32 calculates the rotational speed of the rotor 51 using the aforementioned elapsed time that is measured by the elapsed time measuring section 23, and the stopped position at the start of rotation of the rotor 51 that is estimated by the stopped position estimating section 31. Specifically, the rotational speed estimating section 32 calculates the rotational speed by dividing the angle from the stopped position until an edge of the detection signal is detected by, the elapsed time as shown in the following equation.

$$\omega = (180-m) \times \pi/180/t \text{ [rad/s]}$$

Where, m represents an electrical angle at the stopped position at the start of rotation of the rotor 51, and t represents the aforementioned elapsed time.

The rotational speed estimating section 32 output the aforementioned rotational speed that is determined, as a rotational speed signal. The rotational speed signal is inputted to the estimated phase calculating section 40 that is described later.

The estimated phase calculating section 40 calculates an estimated phase upon the aforementioned calculation instruction signal being inputted from the detection signal determination section 21, that is, upon the detection signal determination section 21 detecting an edge based on the aforementioned detection signal. The estimated phase calculating section 40 calculates an estimated phase by calculating an interpolation phase by integration of the rotational speed determined by the rotational speed estimating section 32, based on the rotational speed signal that is inputted from the initial rotational speed calculation section 30, and adding the interpolation phase in question to a reference phase that is described later. Further, the estimated phase calculating section 40 calculates an interpolation phase based on the aforementioned edge interval signal that is inputted from the elapsed time measuring section 23, and calculates an estimated phase by adding the interpolation phase in question to a reference phase that is described later.

Specifically, the estimated phase calculating section 40 includes a reference phase setting section 41, an interpolation phase calculation section 42 and an arithmetic section 43. The reference phase setting section 41 sets a reference phase in accordance with the detection signal outputted from the rotation position detecting section 13 each time an edge of the detection signal is detected by the detection signal determination section 21. Specifically, when the detection signal is the Low signal, the reference phase setting section 41 sets 0 degrees in terms of electrical angle as the reference phase, and when the detection signal is the High signal, the reference phase setting section 41 sets 180 degrees in terms of electrical angle as the reference phase.

Upon the aforementioned calculation instruction signal being inputted from the detection signal determination section 21, that is, upon an edge of the detection signal being detected by the detection signal determination section 21, the interpolation phase calculation section 42 calculates an interpolation phase by integration of the rotational speed calculated by the initial rotational speed calculation section 30.

Further, upon the aforementioned edge interval signal being inputted from the elapsed time measuring section 23, the interpolation phase calculation section 42 calculates an interpolation phase using the edge interval signal. Specifically, the interpolation phase calculation section 42 determines the rotational speed of the motor 2 by dividing the difference (180 degrees in terms of electrical angle) between the rotation position when the edge of the detection signal is detected and the rotation position when an edge of the detection signal is detected the preceding time by the difference (t2−t1) between a detection time t1 at which the edge of the detection signal is detected the preceding time and a detection time t2 at which the edge of the detection signal is detected the current time. The interpolation phase calculation section 42 then obtains the interpolation phase by integration of the rotational speed.

Upon the aforementioned calculation instruction signal being inputted from the detection signal determination section 21, that is, upon an edge of the detection signal being detected by the detection signal determination section 21, the arithmetic section 43 adopts a value obtained by adding the interpolation phase to the reference phase as the estimated phase. The estimated phase is used for drive control of the motor 2.

(Motor Control Method)

Next, a motor control method that is implemented by actuating the motor control apparatus 1 having the configuration described above will be described using a flowchart illustrated in FIG. 6.

Figure 6:
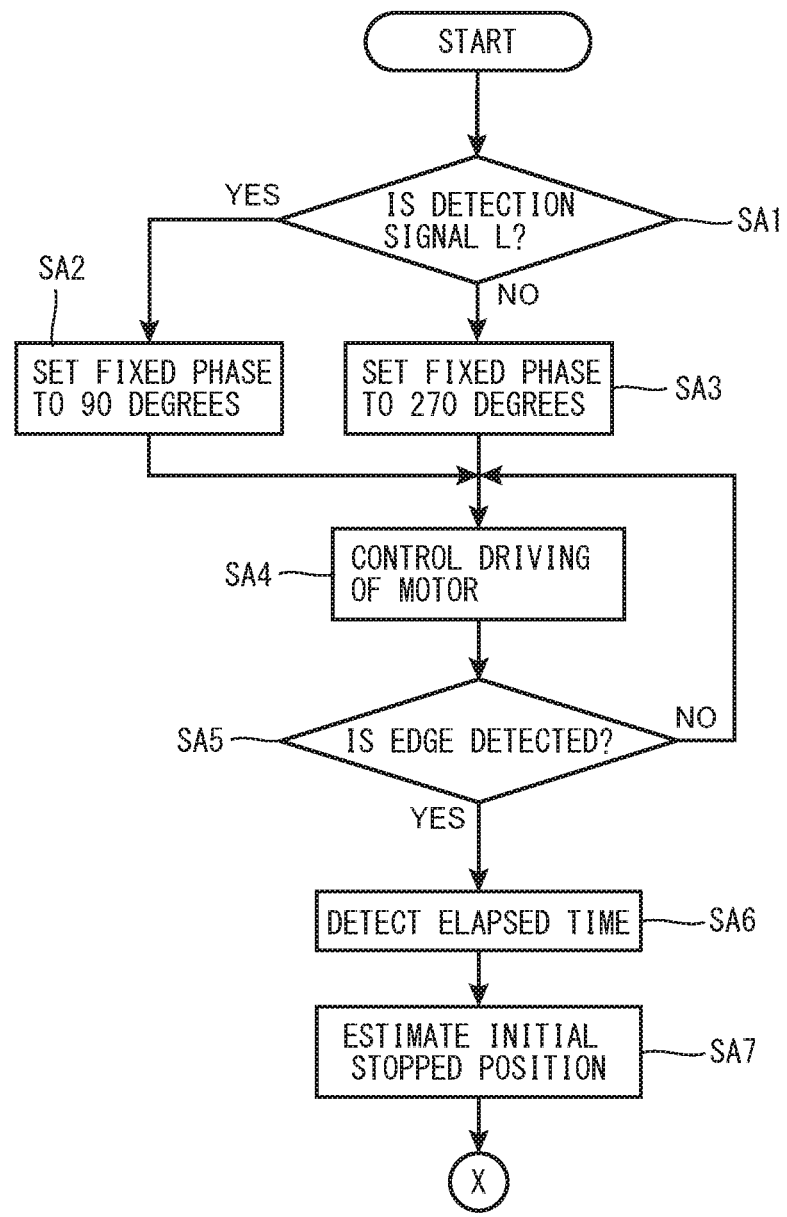
FIG. 6 is a flowchart illustrating an example of operations of a motor control apparatus.
Figure 7:
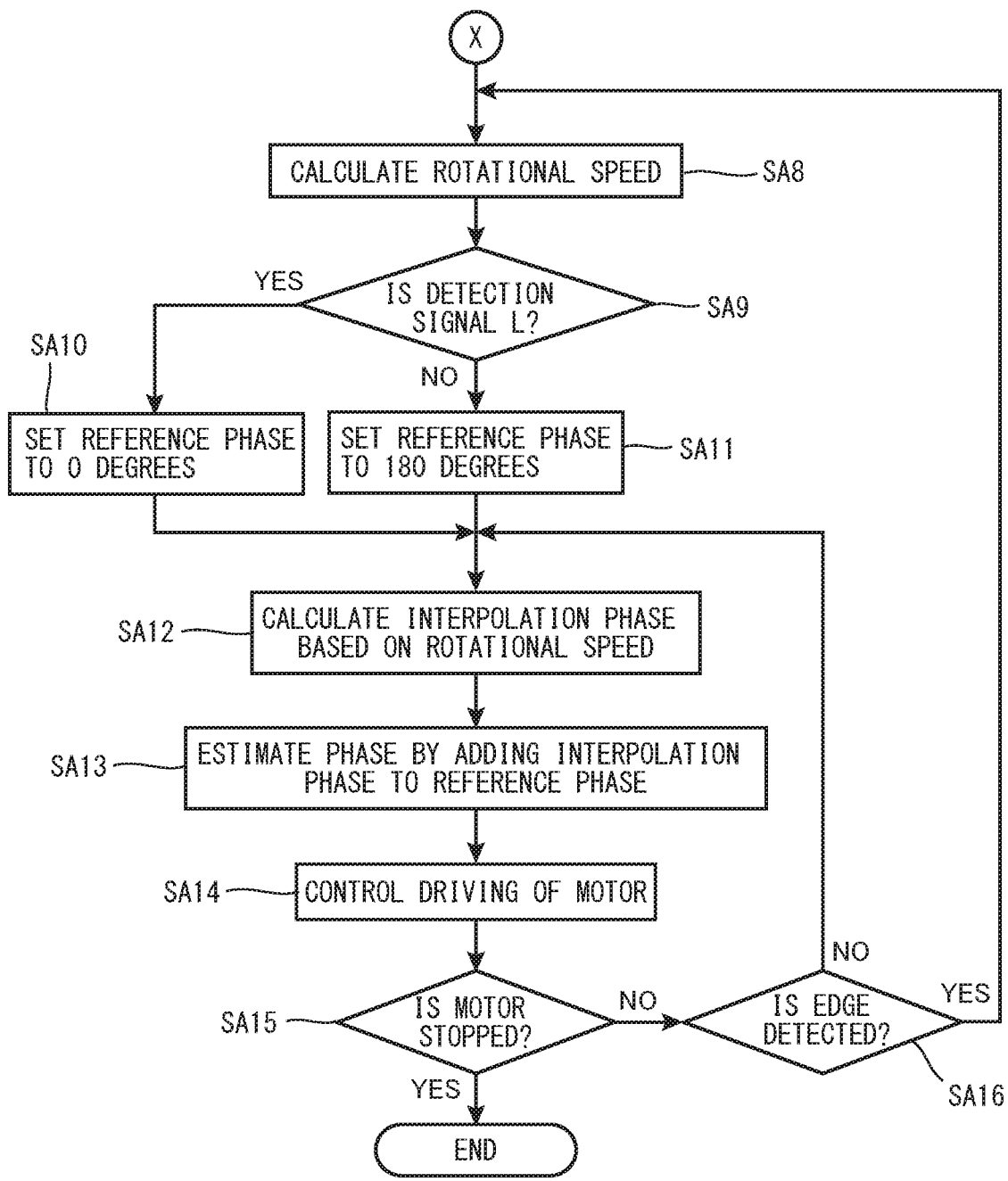
FIG. 7 is a flowchart illustrating an example of operations of a motor control apparatus.

Upon the start of the operations in the flowchart illustrated in FIG. 6, first, in step SA1, the fixed phase setting section 22 determines whether or not the detection signal that is outputted from the rotation position detecting section 13 is the Low signal ("L" in FIG. 6).

If it is determined in step SA1 that the detection signal is the Low signal (Yes in SA1), the operation proceeds to step SA2 in which the fixed phase setting section 22 sets 90 degrees in terms of electrical angle as the fixed phase. On the other hand, if it is determined in step SA1 that the detection signal is not the Low signal (No in SA1), that is, when the detection signal is the High signal, the operation proceeds to step SA3 in which the fixed phase setting section 22 sets 270 degrees in terms of electrical angle as the fixed phase.

After the fixed phase setting section 22 sets the fixed phase in step SA2 or step SA3, the operation proceeds to step SA4 in which the motor drive control section 11 generates a control signal for controlling driving of the motor 2 using the fixed phase. Thereby, the motor 2 is subjected to drive control based on the fixed phase, and the rotor 51 starts to rotate.

Thereafter, the operation proceeds to step SA5 in which the detection signal determination section 21 determines whether or not an edge of the detection signal is detected. If it is determined in step SA5 that an edge of the detection signal is not detected (No in SA5), the operation returns to step SA4, and drive control of the motor 2 is performed using the fixed phase until it is determined in step SA5 that an edge of the detection signal is detected.

In contrast, if it is determined in step SA5 that an edge of the detection signal is detected (Yes in SA5), the operation proceeds to step SA6 in which the elapsed time measuring section 23 outputs, as an elapsed time signal, the elapsed time from the start of rotation of the rotor 51 until the edge of the detection signal is detected.

Next, in step SA7, the stopped position estimating section 31 estimates the stopped position at the time that rotation of the rotor 51 starts (initial stopped position). Specifically, the stopped position estimating section 31 obtains the elapsed time from the start of rotation of the rotor 51 until detection of an edge of the detection signal from the elapsed time measuring section 23 as the elapsed time signal, and estimates the initial stopped position of the rotor 51 based on the elapsed time. The stopped position estimating section 31 estimates the initial stopped position of the rotor 51 by determining the magnitude relationship of the elapsed time with respect to the threshold values $t_{th1}$ and $t_{th2}$ as illustrated in FIG. 5.

Next, in step SA8, the rotational speed estimating section 32 calculates the rotational speed of the rotor 51 using the initial stopped position and the elapsed time. Specifically, the rotational speed estimating section 32 calculates the rotational speed by dividing the angle from the initial stopped position until the edge of the detection signal is detected, by the elapsed time as shown in the following equation.

$$\omega = (180-m) \times \pi/180/t \text{ [rads/s]}$$

Where, m represents the electrical angle at the initial stopped position of the rotor 51, and t represents the aforementioned elapsed time.

In step SA9, the reference phase setting section 41 determines whether or not the detection signal that is outputted from the rotation position detecting section 13 is the Low signal. In step SA9, if it is determined that the detection signal is the Low signal (Yes in SA9), the operation proceeds to step SA10 in which the reference phase setting section 41 sets an electrical angle of 0 degrees as the reference phase. On the other hand, in step SA9, if it is determined that the detection signal is not the low signal (No in SA9), that is, when the detection signal is the High signal, the operation proceeds to step SA11 in which the reference phase setting section 41 sets an electrical angle of 180 degrees as the reference phase.

In step SA12 that the operation proceeds to after step SA10 or SA11, the interpolation phase calculation section 42 calculates an interpolation phase by integration of the rotational speed calculated in step SA8.

Thereafter, the operation proceeds to step SA13 in which the arithmetic section 43 determines an estimated phase by adding the aforementioned interpolation phase to the aforementioned reference phase. Subsequently, in step SA14, the motor drive control section 11 generates a control signal for controlling driving of the motor 2, using the estimated phase determined in step SA13. Thereby, the motor 2 is subjected to drive control based on the estimated phase determined in step SA13.

Thereafter, in step SA15, the motor control apparatus 1 determines whether or not driving of the motor 2 stops. If it is determined in step SA15 that driving of the motor 2 stops (Yes in step SA15), the operation flow ends (end).

On the other hand, if it is determined in step SA15 that driving of the motor 2 is not stopped (No in step SA15), the operation proceeds to step SA16 in which the detection signal determination section 21 makes a determination as to whether or not an edge of the detection signal outputted from the rotation position detecting section 13 is detected.

If it is determined in step SA16 that the edge of the detection signal is detected (Yes in SA16), the operation returns to step SA8 in which the rotational speed estimating section 32 calculates the rotational speed using the difference between the time of the most recent edge detection and the time of the edge detection that immediately precedes the most recent edge detection.

In contrast, in step SA16, if it is determined that the edge of the detection signal is not detected (No in SA16), the operation returns to step SA12.

Here, steps SA1 to SA3 correspond to a fixed phase setting step. Steps SA4 to SA7 correspond to a stopped position estimating step. Step SA8 corresponds to a rotational speed estimating step. Steps SA9 to SA13 correspond to an estimated phase calculating step.

As described above, when an edge of the detection signal that is outputted from the rotation position detecting section 13 is detected, the stopped position at the start of rotation of the rotor 51 can be estimated based on the elapsed time from the start of rotation of the rotor 51 until the detection of the edge of the detection signal. Thereby, the rotational speed of the rotor 51 can be determined, and the estimated phase of the motor 2 can be calculated. That is, the motor 2 can be subjected to drive control in accordance with the rotational speed by detecting an edge of the detection signal one time.

Therefore, it is not necessary to detect an edge of the detection signal two times prior to performing drive control of the motor 2 in accordance with the rotational speed as in the conventional configuration. Hence, the rotor 51 of the motor 2 can be caused to start rotation more quickly in comparison to the conventional configuration.

Further, in the configuration described above, at the start of rotation of the rotor 51, drive control of the motor 2 is performed using a fixed phase that is set according to the detection signal. Furthermore, by setting the 90 degrees or 270 degrees in terms of electrical angle as the fixed phase, the rotor 51 of the motor 2 can be caused to perform forward rotation without being caused to perform reverse rotation. Hence, at the start of rotation of the rotor 51, a phase such that the rotor 51 does not perform reverse rotation can be easily set.

Therefore, by means of the configuration of the present embodiment, the motor 2 can be started with better responsiveness by simpler control in comparison to the conventional configuration.

Other Embodiments

While embodiments of the present invention have been described above, the aforementioned embodiments are merely examples for implementing the present invention. Accordingly, the present invention is not limited to the above embodiments, and the aforementioned embodiments can be appropriately modified and implemented within a range that does not deviate from the gist of the present invention.

In the embodiment described above, at the start of rotation of the rotor 51, until an edge of a detection signal that is outputted from the rotation position detecting section 13 is first detected, the motor 2 is subjected to drive control according to a fixed phase that is set in accordance with the detection signal. However, the motor 2 may be subjected to drive control using a phase other than the fixed phase, as long as the relevant phase is determined so that the rotor 51 does not perform reverse rotation.

In the foregoing embodiment, 90 degrees or 270 degrees in terms of electrical angle is used as the aforementioned fixed phase. However, an electrical angle other than 90 degrees or 270 degrees may be used as the fixed phase. However, the fixed phase is equal to or less than 90 degrees in terms of the absolute value of the electrical angle from a stable stopping point that is nearest to 180 degrees or 360 degrees in terms of electrical angle among the stable stopping points of the rotor 51.

In the foregoing embodiment, an example is mentioned in which tb<tc<ta in a case where, in the respective patterns in which the stopped position at the start of rotation of the rotor 51 is 30 degrees, 90 degrees or 150 degrees in terms of electrical angle, elapsed times from the start of rotation of the rotor 51 until detection of an edge of the detection signal are taken as ta, tb and tc, respectively. However, the stopped position at the start of rotation of the rotor 51 may be estimated using the aforementioned elapsed times with respect to respective patterns in which the stopped position at the start of rotation of the rotor 51 is 210 degrees, 270 degrees or 330 degrees in terms of electrical angle. Further, the relation between the elapsed times is not limited to tb<tc<ta. In this case, it suffices to set threshold values of the aforementioned elapsed times so that which one of the stable stopping points the stopped position at the start of rotation of the rotor 51 is can be estimated according to the elapsed time.

In the foregoing embodiment, the fixed phase setting section 22 sets a fixed phase to 90 degrees in terms of electrical angle. However, it suffices that, in a case where the detection signal that is outputted from the rotation position detecting section 13 is the Low signal, the fixed phase is equal to or greater than −90 degrees in terms of electrical angle relative to the stable stopping point at the maximum electrical angle (in the present embodiments, 150 degrees) and is equal to or less than 90 degrees in terms of electrical angle relative to the stable stopping point at the minimum electrical angle (in the present embodiments, 30 degrees) among the stable stopping points of the rotor 51. Further, it suffices that, in a case where the detection signal that is outputted from the rotation position detecting section 13 is the High signal, the fixed phase is equal to or greater than −90 degrees in terms of electrical angle relative to the stable stopping point at the maximum electrical angle (in the present embodiments, 330 degrees) and is equal to or less than 90 degrees in terms of electrical angle relative to the stable stopping point at the minimum electrical angle (in the present embodiments, 210 degrees) among the stable stopping points of the rotor 51.

In the foregoing embodiment, the stable stopping points are 30 degrees, 90 degrees and 150 degrees within a range of electrical angles from 0 degrees to 180 degrees, and are 210 degrees, 270 degrees and 330 degrees within a range of electrical angles from 180 degrees to 360 degrees. However, in the case of using a motor having a different structure to the aforementioned embodiments, the electrical angles of the stable stopping points are different from the examples in the aforementioned embodiments. The configurations of the aforementioned embodiments are also applicable to such a case. Note that, even in such a case, within a range of electrical angles from 0 degrees to 180 degrees and a range of electrical angles from 180 degrees to 360 degrees, respectively, the stable stopping point at which the electrical angle is smallest is the stable stopping point at the minimum electrical angle, and the stable stopping point at which the electrical angle is largest is the stable stopping point at the maximum electrical angle.

INDUSTRIAL APPLICABILITY

The present invention can be utilized for a motor control apparatus that, when rotation of a motor starts, controls driving of the motor using a detection signal that is outputted at every 180 degrees in terms of electrical angle in accordance with rotation of a rotor.

The invention claimed is:

1. A motor control apparatus, comprising:
   a motor drive control section that controls driving of a motor using a predetermined phase that causes a rotor of the motor to perform forward rotation;
   a rotation position detecting section that outputs a first detection signal and a second detection signal, wherein the first detection signal is different than the second detection signal, the rotation position detecting section alternately outputs only one of the first and second detection signals at every 180 degrees;
   a stopped position estimating section that estimates a stopped position at a start of rotation of the rotor using an elapsed time from when rotation of the rotor starts until the detection signal that is outputted from the rotation position detecting section switches;
   a rotational speed estimating section that estimates a rotational speed of the rotor using the elapsed time and the stopped position; and
   an estimated phase calculating section that calculates an estimated phase as the predetermined phase using the rotational speed.

2. The motor control apparatus according to claim 1, wherein:
   the stopped position estimating section estimates which stable stopping point of the rotor the stopped position is according to the elapsed time.

3. The motor control apparatus according to claim 1, further comprising:
   a fixed phase setting section that, at the start of rotation of the rotor, in accordance with the detection signal, sets as the predetermined phase a fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor.

4. The motor control apparatus according to claim 2, further comprising:
   a fixed phase setting section that, at the start of rotation of the rotor, in accordance with the detection signal, sets as the predetermined phase a fixed phase that is equal to or greater than −90 degrees in terms of electrical angle relative to a stable stopping point at a maximum electrical angle and is equal to or less than 90 degrees in terms of electrical angle relative to a stable stopping point at a minimum electrical angle among stable stopping points of the rotor.

5. A method for controlling a motor, comprising:
   a fixed phase setting step of, at a start of rotation of a rotor of the motor, in accordance with two kinds of detection signals that are outputted from a rotation position detecting section according to a rotation position of the rotor of the motor, wherein the rotation position detecting section outputs a first detection signal and a second detection signal, wherein the first detection signal is different than the second detection signal, the rotation position detecting section alternately outputs only one of the first and second detection signals at every 180 degrees, setting as a fixed phase an electrical angle that is equal to or greater than −90 degrees relative to a stable stopping point at a maximum electrical angle and is equal to or less than 90 degrees relative to a stable stopping point at a minimum electrical angle among stable stopping points of the rotor;
   a stopped position estimating step of estimating a stopped position at a start of rotation of the rotor using an elapsed time from when rotation of the rotor starts until the detection signal that is outputted from the rotation position detecting section switches due to driving of the motor being controlled by means of a motor drive control section using the fixed phase;
   a rotational speed estimating step of estimating a rotational speed of the rotor using the elapsed time and the stopped position; and
   an estimated phase calculating step of calculating an estimated phase using the rotational speed.

* * * * *